United States Patent [19]

Taniguchi et al.

[11] Patent Number: 5,284,691
[45] Date of Patent: Feb. 8, 1994

[54] OPTICAL RECORDING MEDIUM AND METHOD OF REPRODUCING INFORMATION RECORD ON THE OPTICAL RECORDING MEDIUM

[75] Inventors: Hitoshi Taniguchi; Fumio Matsui, both of Tsurugashima, Japan

[73] Assignee: Pioneer Electronic Corporation, Tokyo, Japan

[21] Appl. No.: 961,358

[22] Filed: Oct. 15, 1992

[30] Foreign Application Priority Data

Mar. 10, 1992 [JP] Japan .................................. 4-051541

[51] Int. Cl.$^5$ ................................ B32B 3/00
[52] U.S. Cl. ........................................ 428/64; 428/65; 428/913; 430/270; 430/945; 346/76 L; 346/135.1; 369/288
[58] Field of Search ............................ 428/64, 65, 913; 430/270, 945; 346/76 L, 135.1; 369/288

[56] References Cited

U.S. PATENT DOCUMENTS 5,151,310  9/1992  Yanagisawa ......................... 428/64
5,183,726  2/1993  Taniguchi ............................ 430/342
5,215,868  6/1993  Taniguchi et al. .................. 430/332

*Primary Examiner*—Patrick J. Ryan
*Assistant Examiner*—Elizabeth Evans
*Attorney, Agent, or Firm*—Sughrue, Mion, Zinn, Macpeak & Seas

[57] ABSTRACT

Disclosed is an optical recording medium having recording film containing a photochromic material and a binder, in which the photochromic material is acid anhydride of diarylethene derivative and the binder is polycarbonate. Owing to this structure, the optical recording medium can reliably keep information recorded thereon even when the information is repeatedly reproduced.

3 Claims, 4 Drawing Sheets

OPTICAL RECORDING MEDIUM AND METHOD OF REPRODUCING INFORMATION RECORD ON THE OPTICAL RECORDING MEDIUM

BACKGROUND OF THE INVENTION

The present invention relates to optical recording media, and more particularly to optical recording media using a photochromic material for a recording film.

Photochromic materials have been heretofore used for light quantity adjusting filters, displays, actinometers, recording media for photographic printing, paints, etc. in various fields.

Recently, the photochromic materials have been paid much attention also in a field of optical recording media using laser beam because the materials have such a possibility that they are employable as reversible memory media with information of high density.

In the case of the optical recording media using the photochromic materials for the recording film, recording of information on the optical recording media or erasure of information therefrom is generally carried out in the following manner. When the recording film is irradiated with a recording light having a wavelength of for example 420 nm, a coloring reaction takes place in the irradiated area to form a colored spot recorded with information. When the colored spot recorded with information is irradiated with an erasing light having a wavelength of 550 nm, this spot is decolored to erase a pit recorded with information.

However, if the light having a wavelength of 420 nm is used for reproducing (reading out) information from the recording medium, the colored pit area still remains in the colored state, but other area than the colored pit area is also colored. As a result, all area is colored and the recorded area cannot be distinguished from the non-recorded area. That is, information recorded on the medium is erased. In contrast thereto, if the light having a wavelength of 550 nm is used for reading out information, the pit recorded with information is decolored, and as a result, the recorded information is erased. Accordingly, the most serious problem in the optical recording media using a photochromic material is that information recorded on the media cannot be repeatedly reproduced (read out).

To solve the above problem, a method of reproducing the recorded information using a mixed light consisting of the light having a wavelength of 420 nm (referred to simply as "420 nm light" hereinafter) and the light having a wavelength of 550 nm (referred to simply as "550 nm light" hereinafter) has been proposed. This method is briefly described below.

(1) In the reproduction of the recorded information, when the recorded area is irradiated with the mixed light of the 420 nm light and the 550 nm light, the recorded area tries to absorb the 550 nm light to decolor the area. At this time, the recording material generates heat, and thus generated heat accelerates a coloring reaction brought about by the 420 nm light to keep the area in the colored state.

(2) When the non-recorded area is irradiated with the mixed light of the 420 nm light and the 550 nm light, heat is not generated because the area does not absorb the 550 nm light. Even if the area absorbs the 420 nm light and is colored, the degree of the coloring reaction is slight, and the slightly colored this area is rapidly erased by the 550 nm light. Therefore, the non-recorded area can be kept in the same state.

However, a problem still resides even if the above-mentioned known method is used. That is, a composition of the recording film which is conventionally known causes a coloring reaction in the non-recorded area when the non-recorded area is subjected to reproduction operation with the mixed light, though the level of the coloring reaction in the non-recorded area is very slight as compared with that in the recorded area. This slight coloring induces serious coloring of the non-recorded area. That is, if reproduction operation is repeatedly carried out, the non-recorded area absorbs the 550 nm light to raise the temperature of the area. As a result, the non-recorded area is colored so that the non-recorded area is hardly distinguished from the recorded area.

SUMMARY OF THE INVENTION

The present invention is made in the light of the above circumstances, and the object of the invention is to solve the problem described above and to provide an optical recording medium which can reliably keep information recorded thereon even when the recording medium is subjected to repeated reproduction operations.

For the purpose of solving the above-mentioned problem, the invention provides an optical recording medium having a recording film containing a photochromic material and a binder in which the photochromic material is acid anhydride of diarylethene derivative and the binder is polycarbonate.

In the recording film of the optical recording medium according to the invention, acid anhydride of diarylethene derivative as the photochromic material and polycarbonate as the binder are used in combination. Owing to this combination, there is brought about such a phenomenon that a coloring reaction in the non-recorded area, which is caused by the irradiation with a mixed light (reproducing light) of a recording light and an erasing light, has no temperature dependence when the temperature of the non-recorded area is not higher than 140° C. Accordingly, if an intensity ratio between the recording light and the erasing light in the reproducing light is determined in such a manner that the temperature of the non-recorded area is not higher than 140° C., such a conventional problem that the non-recorded area is colored does not occur even when the non-recorded area is repeatedly subjected to reproduction operation.

DETAILED DESCRIPTION OF THE INVENTION

An optical recording medium of the present invention is described below referring to FIG. 1 of the attached drawings.

Figure 1:
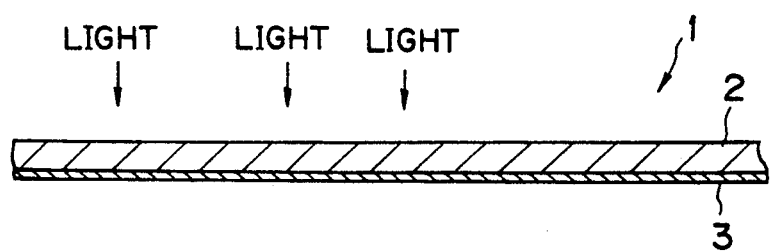
FIG. 1 is a sectional view showing a part of the optical recording medium of the invention.

FIG. 1 is an enlarged sectional view showing a part of the optical recording medium of the invention.

As shown in FIG. 1, the optical recording medium 1 has a recording film 3 on a transparent substrate 2. Recording of information on the recording film 3 of the optical recording medium 1 is generally carried out by irradiating the recording film 3 with a recording light from a side of the transparent substrate 2.

A variety of known additional layers may be provided between the substrate 2 and the recording film 3, or on the recording film 3.

In the recording film 3, a photochromic material and a binder are contained. The photochromic material employable in the invention is acid anhydride of diarylethene derivative represented by the following formula [I], and the binder employable in the invention is polycarbonate.

Formula [I]

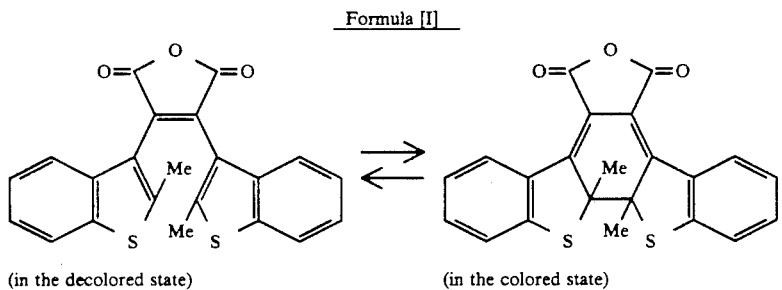

(in the decolored state)   (in the colored state)

Figure 2:
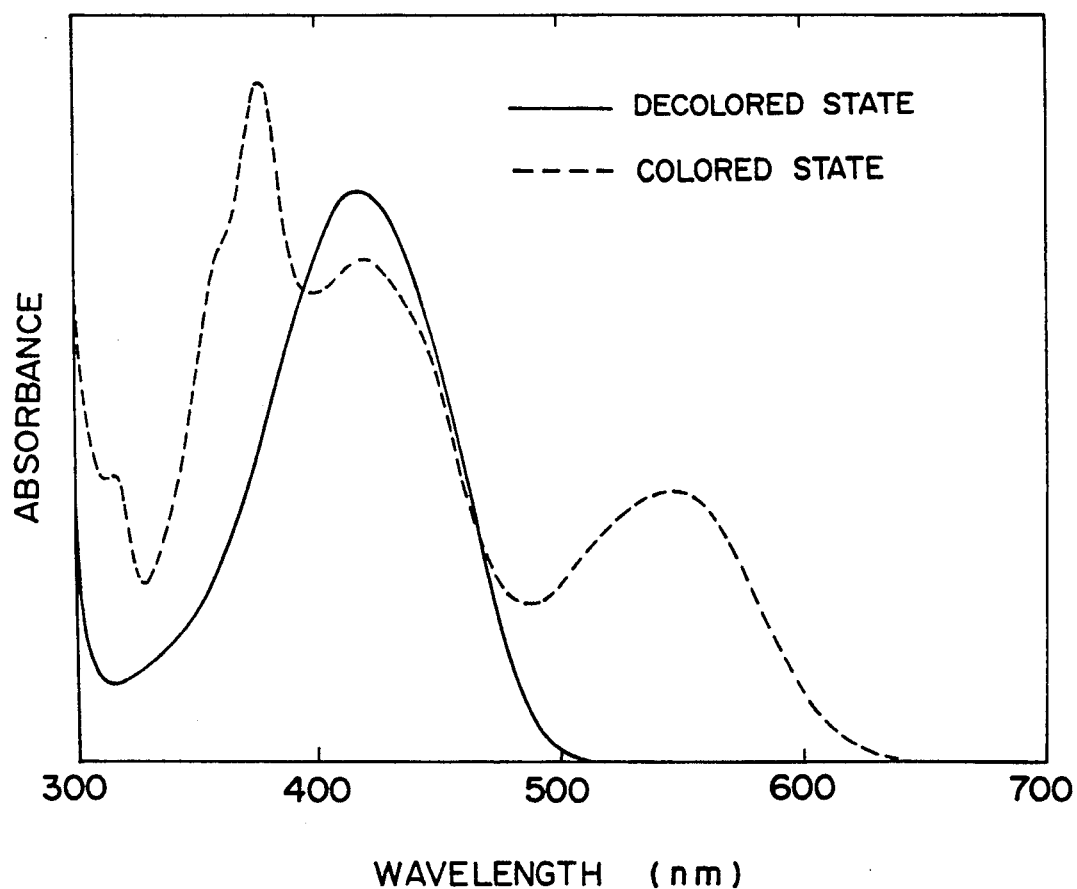
FIG. 2 is a graph showing a relationship between an absorbance of the recording film and a wavelength in case that the recording film is in the decolored state and in the colored state.

The absorbance distribution of the recording film in the decolored state and that in the colored state shown in FIG. 2 are an absorbance distribution of the diarylethene derivative represented by the above formula [I] in the case of a ring opening structure and that in the case of a ring closure structure, respectively.

As shown in the above formula, this compound normally has the ring opening structure (decolored state). However, the compound has the ring closure structure and is colored (colored state) when irradiated with a recording light (e.g., ultraviolet rays). The compound can return to the decolored state from the colored state by irradiation with visible light (erasing light). In other words, the compound is reversible. Accordingly, in the recording film 3, a change of color from decolored state to colored state or a change of color from colored state to decolored state takes place by the irradiation of the recording film 3 with a light having a specific wavelength.

Polycarbonate used as the binder is a polymer having as a main chain a carbonate bond, namely, a carbonic acid ester bond (—O—C(=O)—O—). An example of the polycarbonate is aromatic polycarbonate obtained from sodium salt of bisphenol A and phosgene.

The aforementioned acid anhydride of diarylethene derivative is contained in the recording film in an amount of 1 to 100 parts by weight, preferably 5 to 20 parts by weight, based on 100 parts by weight of the polycarbonate. When the amount of the acid anhydride of diarylethene derivative exceeds 100 parts by weight, there is brought about such a disadvantage that the acid anhydride of diarylethene derivative is not completely dissolved. When the amount thereof is less than 1 part by weight, there is brought about such a disadvantage that the non-recorded area hardly absorbs the light so that the recorded area cannot be formed.

The effect of the invention is shown only by the use of the combination of the diarylethene derivative and the polycarbonate.

The present invention is further described below referring to the following working example.

Preparation of a Sample of the Present Invention 10 parts by weight of acid anhydride of diarylethene derivative was mixed with 100 parts by weight of polycarbonate. The resulting mixture was applied onto a glass substrate to form a recording film having a thickness of 10 μm.

Preparation of a Sample for Comparison 2 parts by weight of acid anhydride of diarylethene derivative was mixed with 100 parts by weight of PMA (polymethacrylic acid). The resulting mixture was applied onto a glass substrate to form a recording film having a thickness of 10 μm.

Figure 3:
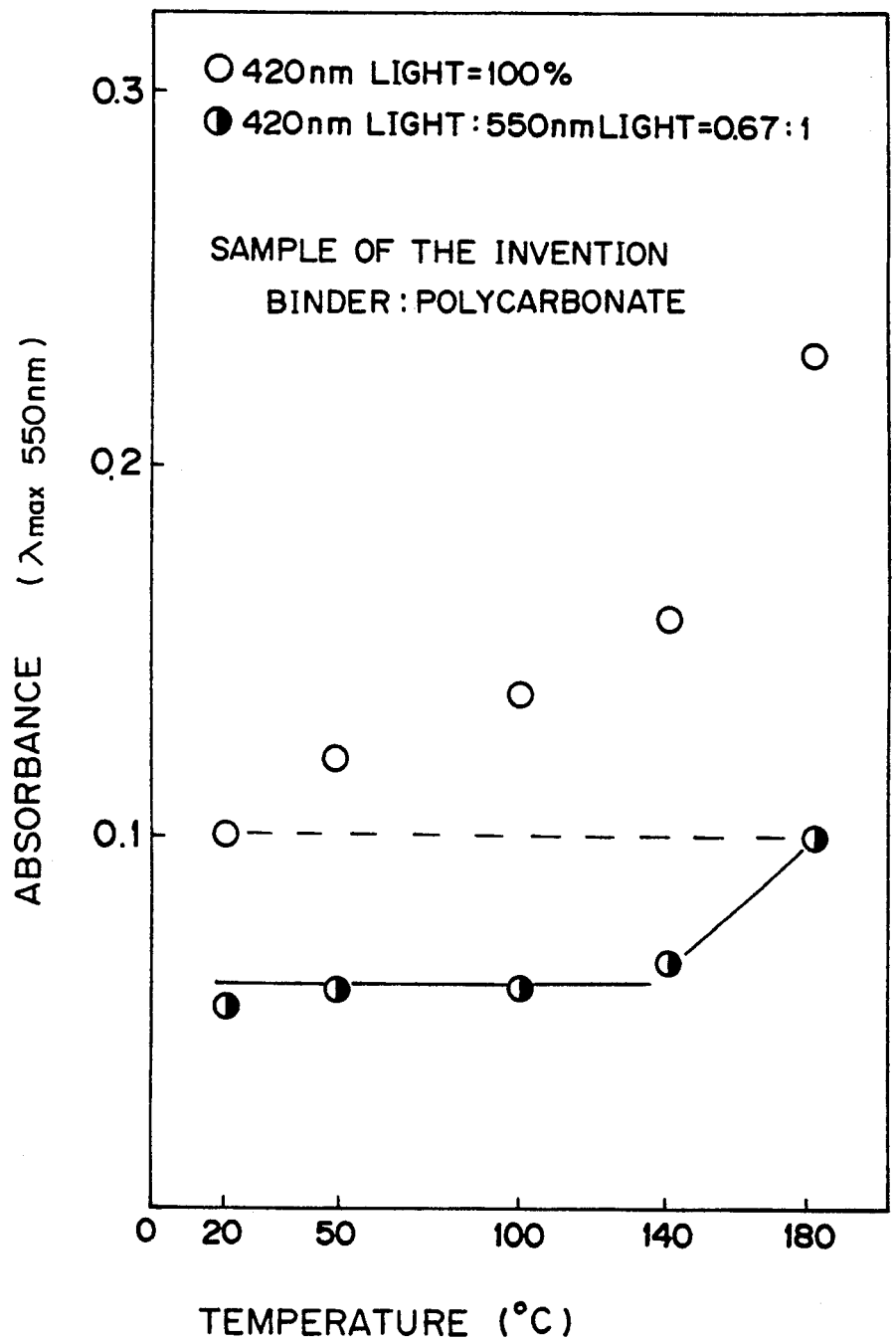
FIG. 3 is a graph showing temperature dependence of a coloring reaction in a sample of the invention when the sample is irradiated with a reproducing light.
Figure 4:
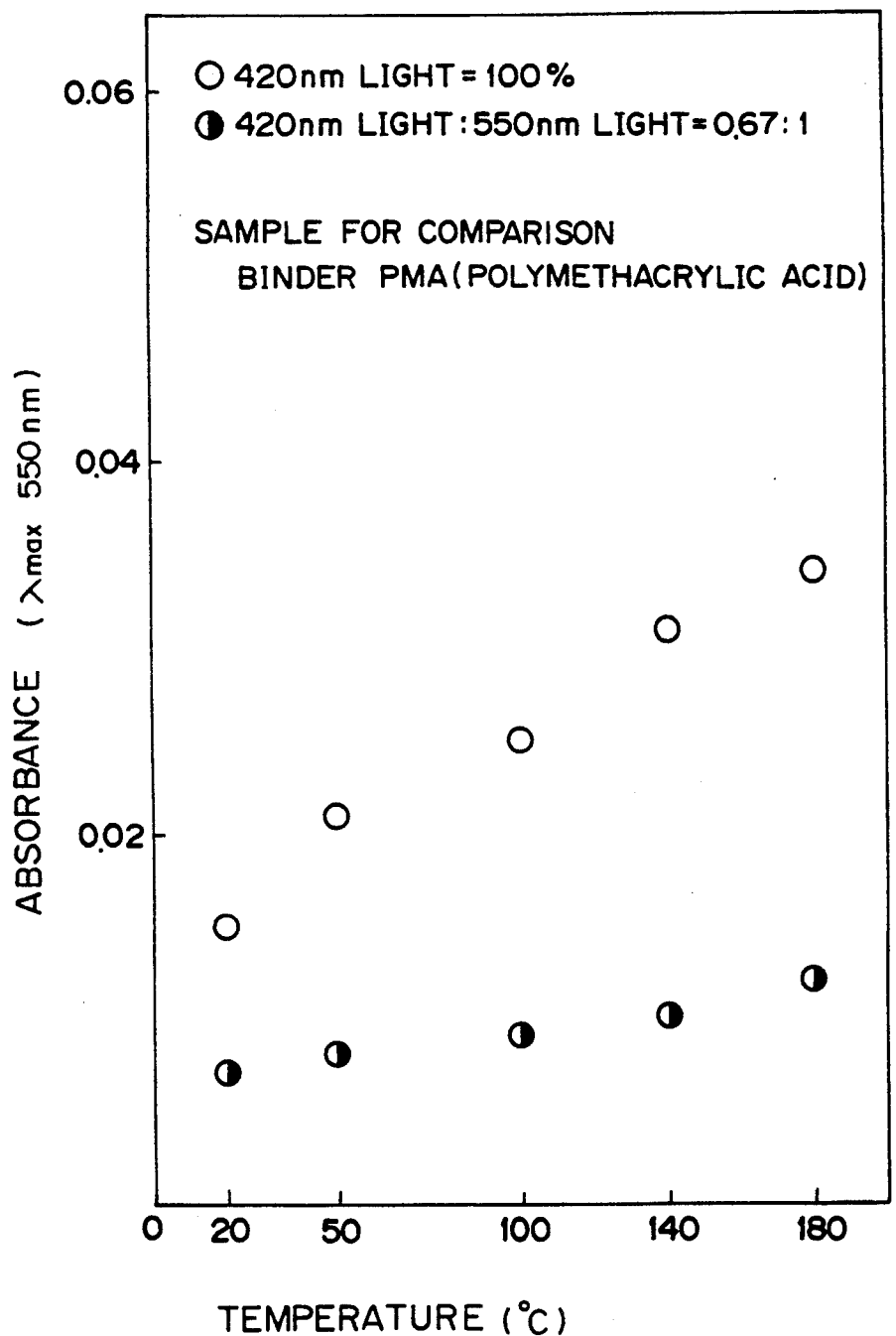
FIG. 4 is a graph showing temperature dependence of a coloring reaction in a sample for comparison when the sample is irradiated with a reproducing light.

Each of the samples prepared as above was irradiated with a mixed light of a 420 nm light (recording light) and a 550 nm light (erasing light) having an intensity ratio between the 420 nm light and the 550 nm light of 0.67:1.00 as a reproducing light (reading light), to examine temperature dependence of coloring in the sample. In detail, each of the samples was placed on a hot plate and irradiated with the above-mentioned reproducing light. When the sample had a predetermined temperature, an absorbance of the sample was measured with the 550 rim light and a degree of coloring was examined. This measurement was carried out at each of the predetermined temperatures to draw a graph. The results are shown in FIG. 3 and FIG. 4. With respect to the sample of the present invention, as shown in FIG. 3, even if the temperature of the non-recorded area is raised, the absorbance is almost uniform and no coloring reaction occurs until the temperature becomes 140° C. In other words, even if the temperature of the nonrecorded area is raised by the repeated reproduction operations, the non-recorded area is not colored until the temperature becomes 140° C., differently from the conventional case. Further, the non-recorded area has sufficient difference from the recorded pit formed by irradiation with the recording light (420 nm light: 100 %).

In contrast thereto, with respect to the sample for comparison (conventional recording medium), a degree of the coloring reaction is gradually increased in accordance with the temperature rise of the non-recorded area, as shown in FIG. 4. That is, it has been confirmed that the recorded area and the non-recorded area cannot be distinguished from each other because of this coloring reaction in the case of repeatedly carrying out reproduction operation.

Such a tendency of the sample for comparison as shown in FIG. 4 was also found in the case of using each of vinyl chloride (PVC), polystyrene (PS) and polymethyl methacrylate (PMMA) as the binder.

As is evident from the results obtained in the above example, a remarkable effect is shown with respect to the optical recording medium of the present invention by using the mixed light of the 420 nm light and the 550 nm light as the reproducing light and determining an intensity ratio between the 420 nm light and the 550 nm light in such a manner that a temperature of the non-recorded area becomes not higher than 140° C. and a temperature of the recorded area becomes higher than 140° C.

The effect of the invention is apparent from the results described above. That is, the recording film used for the invention contains acid anhydride of diarylethene derivative as the photochromic material and polycarbonate as the binder in combination. Owing to this combination, there is brought about such a phenomenon that coloring reaction in the non-recorded area has no temperature dependence when the temperature of the area is not higher than 140° C. Accordingly, the intensity ratio of the recording light and the erasing light in the reproducing light is determined in such a manner that the temperature of the non-recorded area is not higher than 140° C., and thereby information can be reliably kept in the optical recording medium even when the medium is repeatedly subjected to reproduction operation.

What is claimed is:

1. An optical recording medium having a recording film containing a photochromic material and a binder, wherein said photochromic material is acid anhydride of diarylethene derivative and said binder is polycarbonate.

2. An optical recording medium as claimed in claim 1, wherein the acid anhydride of diarylethene derivative is contained in the recording film in an amount of 1 to 100 parts by weight based on 100 parts by weight of the polycarbonate.

3. An optical recording medium as claimed in claim 1, wherein the acid anhydride of diarylethene derivative is contained in the recording film in an amount of 5 to 20 parts by weight based on 100 parts by weight of the polycarbonate.

* * * * *